(12) United States Patent
Marschner et al.

(10) Patent No.: US 7,433,807 B2
(45) Date of Patent: *Oct. 7, 2008

(54) FACIAL IMAGE PROCESSING

(75) Inventors: Stephen Marschner, Kirkland, WA (US); Brian K. Guenter, Redmond, WA (US); Sashi Raghupathy, Redmond, WA (US); Kirk Olynyk, Redmond, WA (US); Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/218,164

(22) Filed: Sep. 1, 2005

(65) Prior Publication Data

US 2006/0015308 A1  Jan. 19, 2006

Related U.S. Application Data

(63) Continuation of application No. 10/837,424, filed on Apr. 30, 2004, now Pat. No. 7,124,066, which is a continuation of application No. 09/652,600, filed on Aug. 30, 2000, now Pat. No. 6,850,872.

(51) Int. Cl.
G06F 7/60 (2006.01)

(52) U.S. Cl. ................. 703/2; 345/473; 345/419; 382/117; 382/118; 382/104; 382/103; 250/201.4; 250/201.7

(58) Field of Classification Search ............ 348/207.11; 250/201.4, 201.7; 382/118, 104; 345/473
See application file for complete search history.

(56) References Cited

U.S. PATENT DOCUMENTS

| 4,965,442 | A | * | 10/1990 | Girod et al. ............ 250/201.7 |
| 5,003,166 | A | * | 3/1991 | Girod ................. 250/201.4 |
| 5,631,976 | A | | 5/1997 | Bolle et al. |
| 5,793,879 | A | | 8/1998 | Benn et al. |
| 6,115,058 | A | * | 9/2000 | Omori et al. ................ 348/45 |
| 6,173,068 | B1 | | 1/2001 | Prokoski |
| 6,272,231 | B1 | * | 8/2001 | Maurer et al. ............. 382/103 |
| 6,341,878 | B1 | | 1/2002 | Chiang |
| 6,400,835 | B1 | | 6/2002 | Lemelson et al. |
| 6,415,172 | B1 | * | 7/2002 | Painchaud et al. .......... 600/407 |
| 6,593,925 | B1 | | 7/2003 | Hakura et al. |

(Continued)

OTHER PUBLICATIONS

Yuille et al., "Shape and Albedo from Multiple Images Using Integrability," 1997 IEEE Computer Society Conference on Computer Vision and Pattern Recognition, pp. 158-164 (Jun. 1997).

(Continued)

*Primary Examiner*—Hugh Jones
*Assistant Examiner*—Cuong V Luu
(74) *Attorney, Agent, or Firm*—Lee & Hayes, PLLC

(57) ABSTRACT

In the described embodiment, methods and systems for processing facial image data for use in animation are described. In one embodiment, a system is provided that illuminates a face with illumination that is sufficient to enable the simultaneous capture of both structure data, e.g. a range or depth map, and reflectance properties, e.g. the diffuse reflectance of a subject's face. This captured information can then be used for various facial animation operations, among which are included expression recognition and expression transformation.

17 Claims, 20 Drawing Sheets
(10 of 20 Drawing Sheet(s) Filed in Color)

U.S. PATENT DOCUMENTS

| | | | |
|---|---|---|---|
| 6,714,665 B1 * | 3/2004 | Hanna et al. | 382/117 |
| 6,775,397 B1 * | 8/2004 | Hamalainen | 382/118 |
| 6,847,740 B1 * | 1/2005 | Birkle | 382/276 |
| 6,850,872 B1 | 2/2005 | Marschner et al. | |
| 7,015,950 B1 * | 3/2006 | Pryor | 348/207.11 |
| 7,110,570 B1 * | 9/2006 | Berenz et al. | 382/104 |
| 7,184,047 B1 * | 2/2007 | Crampton | 345/473 |

OTHER PUBLICATIONS

Stephen R. Marschner et al, Image-based BRDF Measurement Including Human Skin In Rendering Techniques, 1999 (Proceedings of the Eurographic Workshop on Rendering), pp. 131-144.

Yuencheng Lee et al., Realistic Modeling For Facial Animation Computer Graphics, 29(2), pp. 55-62, Jul. 1995.

Yizhou Yu, "Inverse Global Illumination: Recovering Reflectance Models of Real Scenes From Photographs In Computer Graphics," (SIGGRAPH 1999 Proceedings), pp. 215-224, Aug. 1999.

Volker Blanz et al., "A Morphable model for the Synthesis of 3d Faces," Proceedings of SIGGRAPH, 1999, pp. 187-194 1999.

Backman et al., "Polarized Light Scattering Spectroscopy for Quantitative Measurements of Epithelial Cellular Structures In Situ," IEEE Journal on Selected Topics In Quantum Electronics vol. 5, No. 4, pp. 1019-1026 (Jul. 1999).

Brian Gunter et al., "Making Faces," Proceedings of SIGGRAPH 1998, pp. 55-67 1998.

Charles Loop, Smooth Subdivision Surfaces Based on Triangles, PhD Thesis, University of Utah, Aug. 1987.

Debevec et al., "Acquiring the Reflectance Field of Human Face," ACM Proceedings of the 27th Annual Conference on Computer Graphics and Interactive Techniques, pp. 145-156 (Jul. 2000).

Eric P.F. Lafortune, "Non-linear Approximation of Reflection Functions In Computer Graphics," (SIGGRAPH 1997 Proceedings), pp. 117-126, Aug 1997.

Frederic Pighin et al., "Synthesizing Realistic Facial Expressions From Photographs In Computer Graphics," (SIGGRAPH 1998 Proceedings), pp. 78-84, Jul. 1998.

Hughes Hoppe et al., "Piecewise Smooth Surface Reconstruction In Computer Graphics," (SIGGRAPH 1994 Proceedings), pp. 295-302, Jul. 1994.

Keith Waters, "A Muscle Model For Animating Three-Dimensional Facial Expression," In Maureen C. Stone editor, Computer Graphics, (SIGGRAPH Proceedings 1987) vol. 21, pp. 17-24, Jul. 1987.

Kriegman et al., "Shape and Enlightenment: Reconstruction and Recognition Under Variable Illumination," 1999 Intl. Symposium on Robotics Research (Oct. 1999), (paper available at ftp://cvc.yale.edu/Renderings/Papers/rc3_ISRR99.ps).

Lee, Aaron et al., "Displaced Subdivision Surfaces," Submitted for Publication, Date unknown.

Pat Hanrahan et al. Reflection; Reflection For Layered Surfaces Due to Subsurface Scattering Proceedings of SIGGRAPH 1993 pp. 165-174 1993.

Marschner, S., Inverse Rendering For Computer Graphics, Ph D Thesis, Aug. 1998, fig. 3.3, pp. 1, 15, 54-60, 63-67.

Marschner, et al., "Reflectance Measurements of Human Skin", SIGGRAPH 99, Jan. 1999, pp. 12.

* cited by examiner

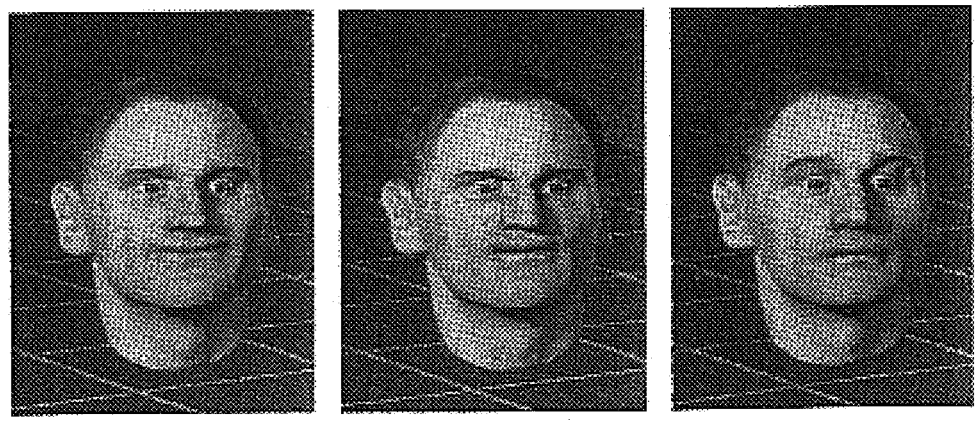
c
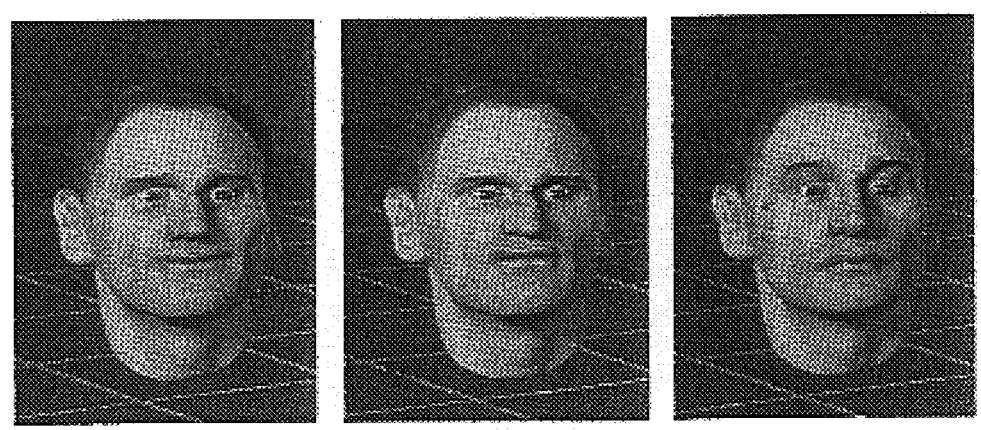
d
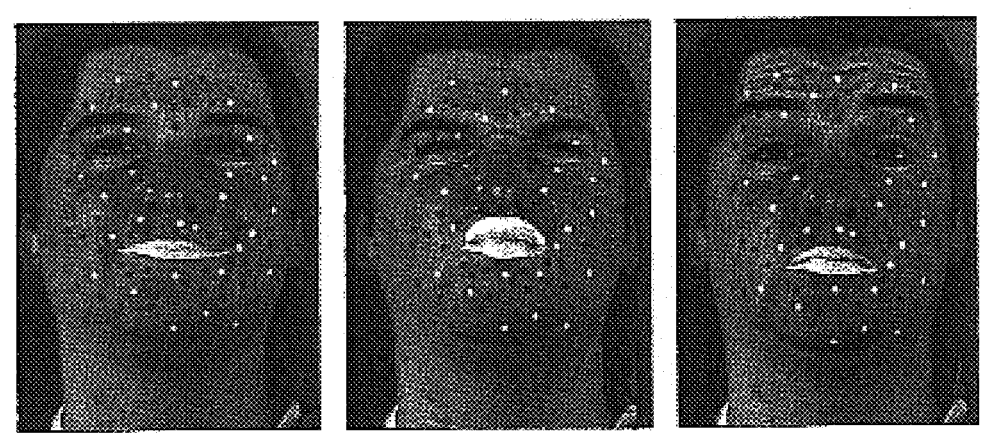
e
Fig. 7

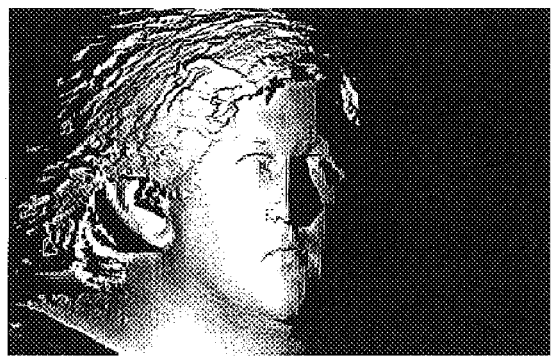
Fig. 13

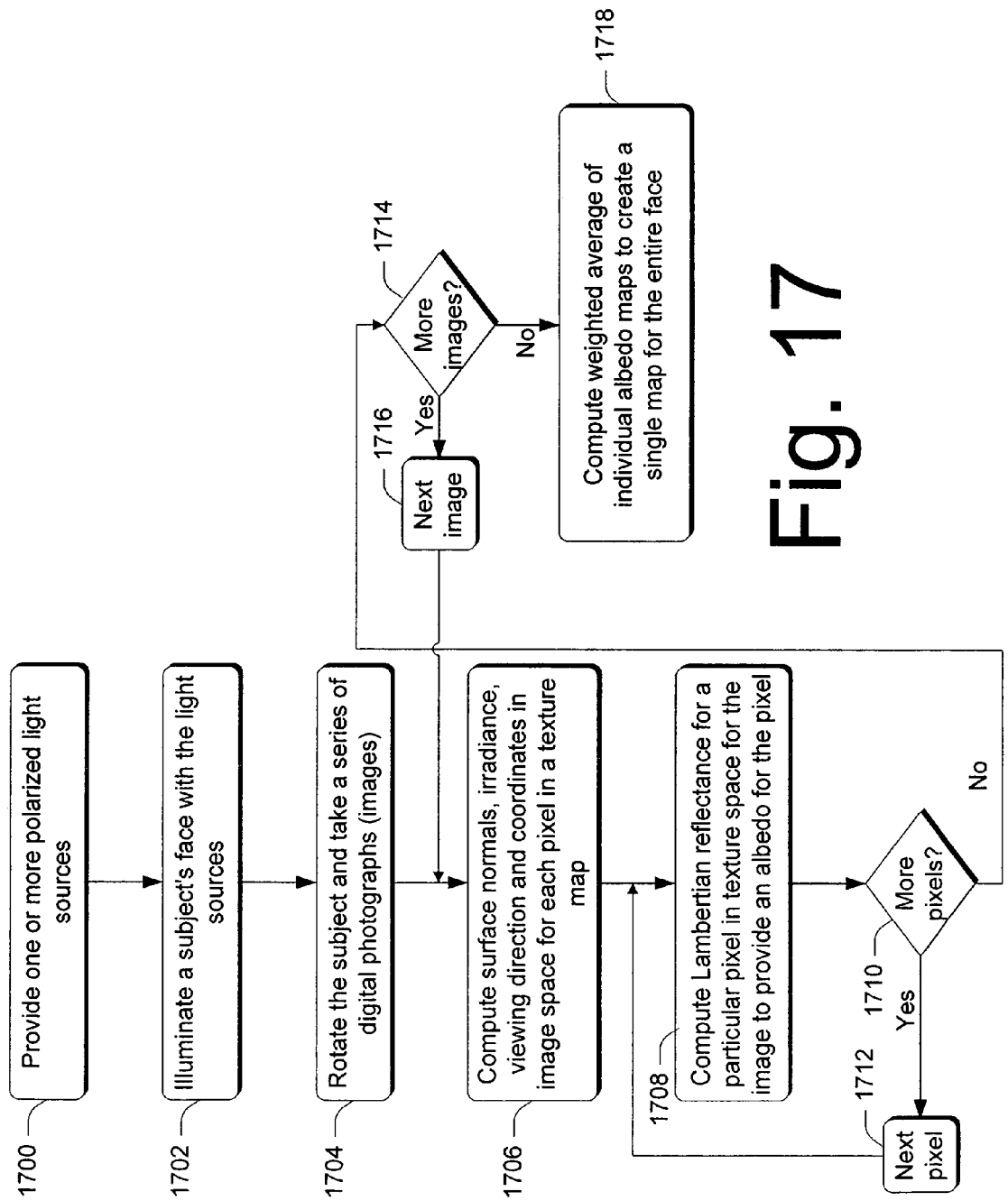

FACIAL IMAGE PROCESSING

RELATED PATENT APPLICATIONS

This is a continuation of and claims priority to both U.S. patent application Ser. Nos. 10/837,424 and 09/652,600, the disclosures of which are incorporated by reference herein.

BACKGROUND

The field of computer graphics involves rendering various objects so that the objects can be displayed on a computer display for a user. For example, computer games typically involve computer graphics applications that generate and render computer objects for display on a computer monitor or television. Modeling and rendering realistic images is a continuing challenge for those in the computer graphics field. One particularly challenging area within the computer graphics field pertains to the rendering of realistic facial images. As an example, a particular computer graphics application may render a display of an individual engaging in a conversation. Often times, the ultimately rendered image of this individual is very obviously a computer-rendered image that greatly differs from a real individual.

Modeling and rendering realistic faces and facial expressions is a particularly difficult task for two primary reasons. First, the human skin has reflectance properties that are not well modeled by the various shading models that are available for use. For example, the well-known Phong model does not model human skin very well. Second, when rendering facial expressions, the slightest deviation from what would be perceived as "real" facial movement is perceived by even the casual viewer as being incorrect. While current facial motion capture systems can be used to create quite convincing facial animation, the captured motion is much less convincing, and frequently very strange, when applied to another face. For example, if a person provides a sampling of their facial movements, then animating their specific facial movements is not difficult considering that the face from which the movements originated is the same face. Because of this, there will be movement characteristics that are the same or very similar between expressions. Translating this person's facial movements to another person's face, however, is not often times convincing because of, among other things, the inherent differences between the two faces (e.g. size and shape of the face).

Accordingly, this invention arose out of concerns associated with providing improved systems and methods for modeling texture and reflectance of human skin. The invention also arose out of concerns associated with providing systems and methods for reusing facial motion capture data by transforming one person's facial motions into another person's facial motions.

SUMMARY

The illustrated and described embodiments propose inventive techniques for capturing data that describes 3-dimensional (3-D) aspects of a face, transforming facial motion from one individual to another in a realistic manner, and modeling skin reflectance.

In the described embodiment, a human subject is provided and multiple different light sources are utilized to illuminate the subject's face. One of the light sources is a structured light source that projects a pattern onto the subject's face. This structured light source enables one or more cameras to capture data that describes 3-D aspects of the subject's face. Another light source is provided and is used to illuminate the subject's face. This other light source is sufficient to enable various reflectance properties of the subject's face to be ascertained. The other light source is used in conjunction with polarizing filters so that the specular component of the face's reflectance is eliminated, i.e. only the diffuse component is captured by the camera. The use of the multiple different light sources enables both structure and reflectance properties of a face to be ascertained at the same time. By selecting the light sources carefully, for example, by making the light sources narrowband and using matching narrowband filters on the cameras, the influence of ambient sources of illumination can be eliminated.

Out of the described illumination process, two useful items are produced—(1) a range map (or depth map) and (2) an image of the face that does not have the structured light source pattern in it. A 3D surface is derived from the range map and surface normals to the 3D surface are computed. The processing of the range map to define the 3D surface can optionally include a filtering step in which a generic face template is combined with the range map to reject undesirable noise. The computed surface normals and the image of the face are then used to derive an albedo map. An albedo map is a special type of texture map in which each sample describes the diffuse reflectance of the surface of a face at a particular point on the surface. Accordingly, at this point in the process, information has been ascertained that describes the 3D-aspects of a face (i.e. the surface normals), and information that describes the face's reflectance (i.e. the albedo map).

In one embodiment, the information or data that was produced in the illumination process is used to transform facial expressions of one person into facial expressions of another person. In this embodiment, the notion of a code book is introduced and used.

A code book contains data that describes many generic expressions of another person (person A). One goal is to take the code book expressions and use them to transform the expressions of another person (person B). To do this, an inventive method uses person B to make a set of training expressions. The training expressions consist of a set of expressions that are present in the code book. By using the training expressions and each expression's corresponding code book expression, a transformation function is derived. The transformation function is then used to derive a set of synthetic expressions that should match the expressions of person B. That is, once the transformation function is derived, it is applied to each of the expressions in the code book so that the code book expressions match the expressions of person B. Hence, when a new expression is received, e.g. from person B, that might not be in the training set, the synthesized code book expressions can be searched for an expression that best matches the expression of person B.

In another embodiment, a common face structure is defined that can be used to transform facial expressions and motion from one face to another. In the described embodiment, the common face structure comprises a coarse mesh structure or "base mesh" that defines a subdivision surface that is used as the basis for transforming the expressions of one person into another. A common base mesh is used for all faces thereby establishing a correspondence between two or more faces. Accordingly, this defines a structure that can be used to adapt face movements from one person to another. According to this embodiment, a technique is used to adapt the subdivision surface to the face model of a subject. The inventive technique involves defining certain points on the subdivision surface that are mapped directly to corresponding points on the face model. This is true for every possible different face model. By adding this constraint, the base mesh has a property in that it fits different face models in the same way. In addition, the inventive algorithm utilizes a smoothing functional that is minimized to ensure that there is a good correspondence between the base mesh and the face model.

In another embodiment, a reflectance processing technique is provided that gives a measure of the reflectance of the surface of a subject's face. To measure reflectance, the inventive technique separates the reflectance into its diffuse and specular components and focuses on the treatment of the diffuse components.

To measure the diffuse component, an albedo map is first defined. The albedo map is defined by first providing a camera and a subject that is illuminated by multiple different light sources. The light sources are filtered by polarizing filters that, in combination with a polarizing filter placed in front of the camera, suppress specular reflection or prevent specular reflection from being recorded. A sequence of images is taken around the subject's head. Each individual image is processed to provide an individual albedo map that corresponds to that image. All of the albedo maps for a particular subject are then combined to provide a single albedo map for the subject's entire face.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 7 is a collection of exemplary color plates that illustrate an exemplary expression transformation in accordance with the described embodiment.

FIG. 13 is a color picture of an exemplary weighting function that corresponds to the FIG. 12 photographs.

FIG. 17 is a flow diagram that describes steps in a method for creating an albedo map in accordance with the described embodiment.

DETAILED DESCRIPTION

Overview

Rendering realistic faces and facial expressions requires very good models for the reflectance of skin and the motion of the face. Described below are methods and techniques for modeling, animating, and rendering a face using measured data for geometry, motion, and reflectance that realistically reproduces the appearance of a particular person's face and facial expressions. Because a complete model is built that includes geometry and bi-directional reflectance, the face can be rendered under any illumination and viewing conditions. The described modeling systems and methods create structured face models with correspondences across different faces, which provide a foundation for a variety of facial animation operations.

The inventive embodiments discussed below touch upon each of the parts of the face modeling process. To create a structured, consistent representation of geometry that forms the basis for a face model and that provides a foundation for many further face modeling and rendering operations, inventive aspects extend previous surface fitting techniques to allow a generic face to be conformed to different individual faces. To create a realistic reflectance model, the first known practical use of recent skin reflectance measurements is made. In addition, newly measured diffuse texture maps have been added using an improved texture capture process. To animate a generic mesh, improved techniques are used to produce surface shapes suitable for high quality rendering.

Exemplary Computer System

Figure 1:
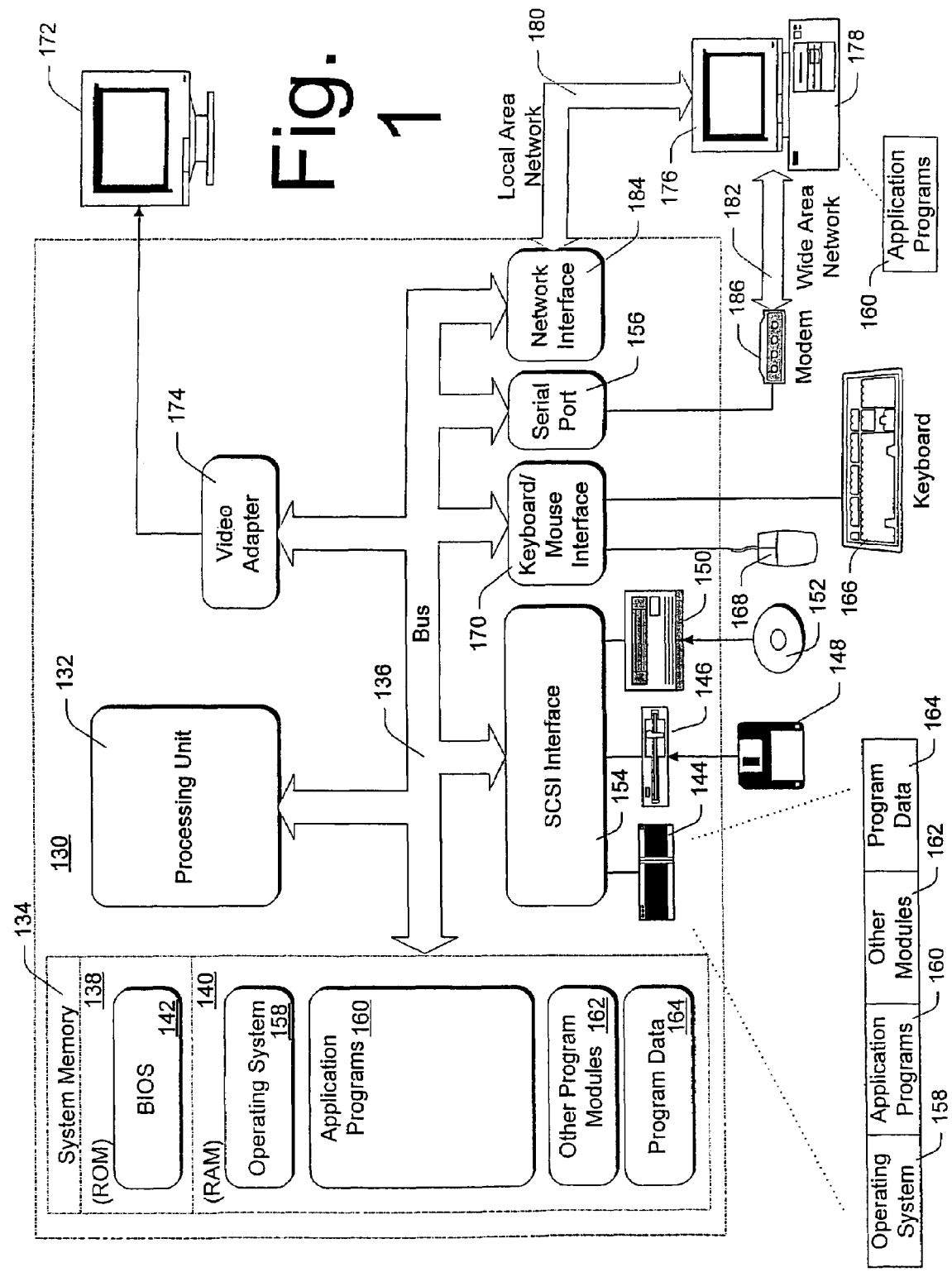
FIG. 1 is a high level diagram of a general purpose computer that is suitable for use in implementing the described embodiments.

Preliminarily, FIG. 1 shows a general example of a desktop computer 130 that can be used in accordance with the described embodiments. Various numbers of computers such as that shown can be used in the context of a distributed computing environment. These computers can be used to render graphics and process images in accordance with the description given below.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate peripheral interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, and one or more cameras, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means, such as a network interface, for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary System for Capturing Structure and Properties of a Facial Surface

In the past, capturing systems have not been able to capture both facial structure and reflectance properties of a whole face independently at the same time. There are systems that, for example, use structured light to capture the structure of the face—but these systems do not capture properties of the face such as the reflectance. Similarly, there are systems that capture reflectance of the face—but such systems do not capture facial structure. The ability to capture facial structure and reflectance independently at the same time makes it possible to perform additional operations on collected data which is useful in various face rendering and animation operations. One particular example of an exemplary rendering operation is described below. It is to be understood, however, that the information or data that is produced as a result of the system and method described below can be utilized in various other areas. For example, areas of application include, without limitation, recognition of faces for security, personal user interaction, etc., building realistic face models for animation in games, movies, etc., and allowing a user to easily capture his/her own face for use in interactive entertainment or business communication.

Figure 2:
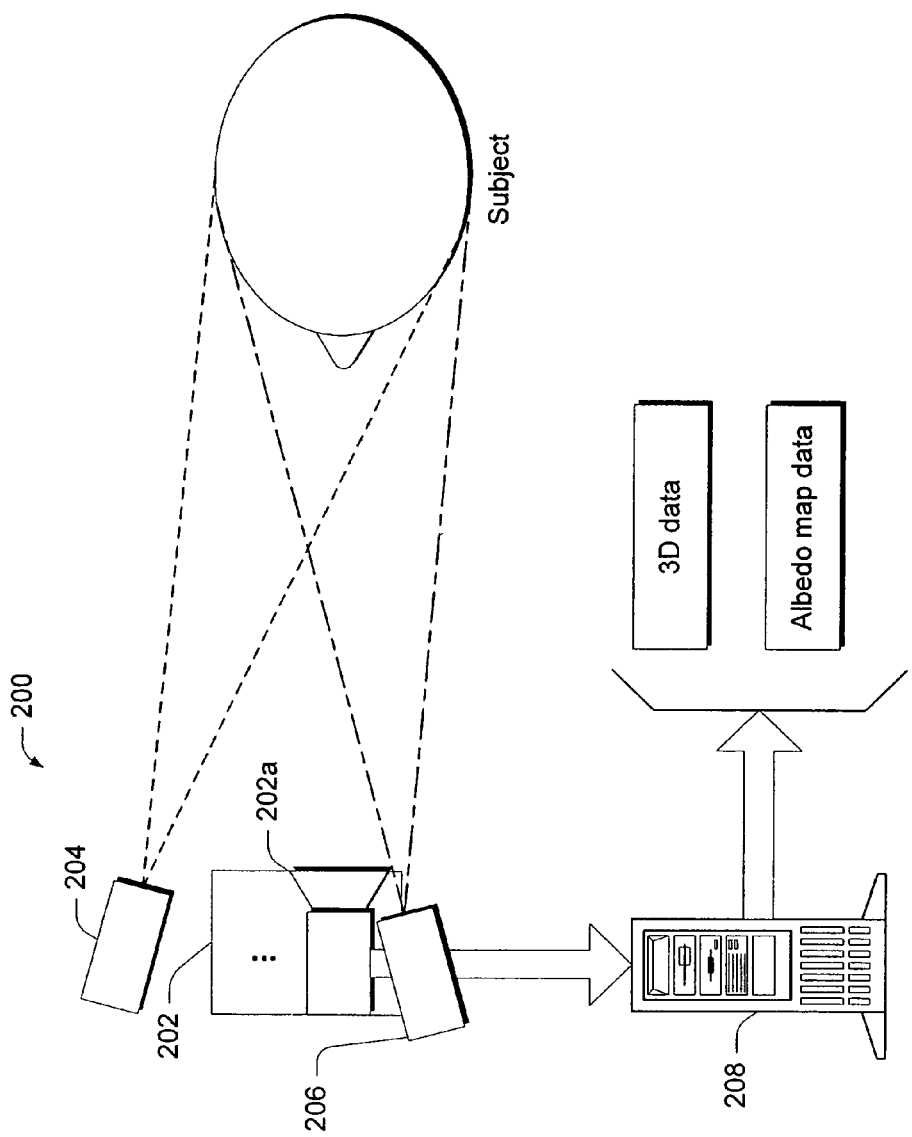
FIG. 2 is a schematic diagram of a system that can be utilized to capture both structural information and reflectance information of a subject's face at the same time.

FIG. 2 shows an exemplary system 200 that is suitable for use in simultaneously or contemporaneously capturing facial structure and reflectance properties of a subject's face. The system includes a data-capturing system in the form of one or more cameras, an exemplary one of which is camera 202. Camera 202 can include a CCD image sensor and related circuitry for operating the array, reading images from it, converting the images to digital form, and communicating those images to the computer. The system also includes a facial illumination system in the form of multiple light sources or projectors. In the case where multiple cameras are used, they are genlocked to allow simultaneous capture in time. In the illustrated example, two light sources 204, 206 are utilized. Light source 204 desirably produces a structured pattern that is projected onto the subject's face. Light source 204 can be positioned at any suitable location. This pattern enables structural information or data pertaining to the 3-D shape of the subject's face to be captured by camera 202. Any suitable light source can be used, although a pattern composed of light in the infrared region can be advantageously employed. Light source 206 desirably produces light that enables camera 202 to capture the diffuse component of the face's reflectance property. Light source 206 can be positioned at any suitable location although it has been advantageously placed in line with the camera's lens 202a through, for example, beam splitting techniques. This light source could also be adapted so that it encircles the camera lens. This light source is selected so that the specular component of the reflectance is suppressed or eliminated. In the illustrated example, a linear polarizing filter is employed to produce polarized illumination, and a second linear polarizer, which is oriented perpendicularly to the first, is placed in front of the lens 202a so that specular reflection from the face is not recorded by the camera. The above-described illumination system has been simulated using light sources at different frequencies, e.g. corresponding to the red and green channels of the camera. Both of the channels can, however, be in the infrared region. Additionally, by selecting the light sources to be in a narrow band (e.g. 780-880 nm), the influence of ambient light can be eliminated. This property is only achieved when the camera is also filtered to a narrow band. Because the illumination from the light source is concentrated into a narrow band of wavelengths whereas the ambient light is spread over a broad range of wavelengths, the light from the source will overpower the ambient light for those particular wavelengths. The camera, which is filtered to record only the wavelengths emitted by the source, will therefore be relatively unaffected by the ambient light. As a result, the camera will only detect the influence of the selected light sources on the subject.

Using the multiple different light sources, and in particular, an infrared light source in combination with a polarized light source (which can be an infrared light source as well) enables the camera (which is configured with a complementary polarizer) to simultaneously or contemporaneously capture structural information or data about the face (from light source 204) and reflectance information or data about the face (from light source 206) independently. The structural information describes 3-dimensional aspects of the face while the reflectance information describes diffuse reflectance properties of the face. This information is then processed by a computerized image processor, such as computer 208, to provide information or data that can be used for further facial animation operations. In the example about to be described, this information comprises 3-dimensional data (3D data) and an albedo map.

Figure 3:
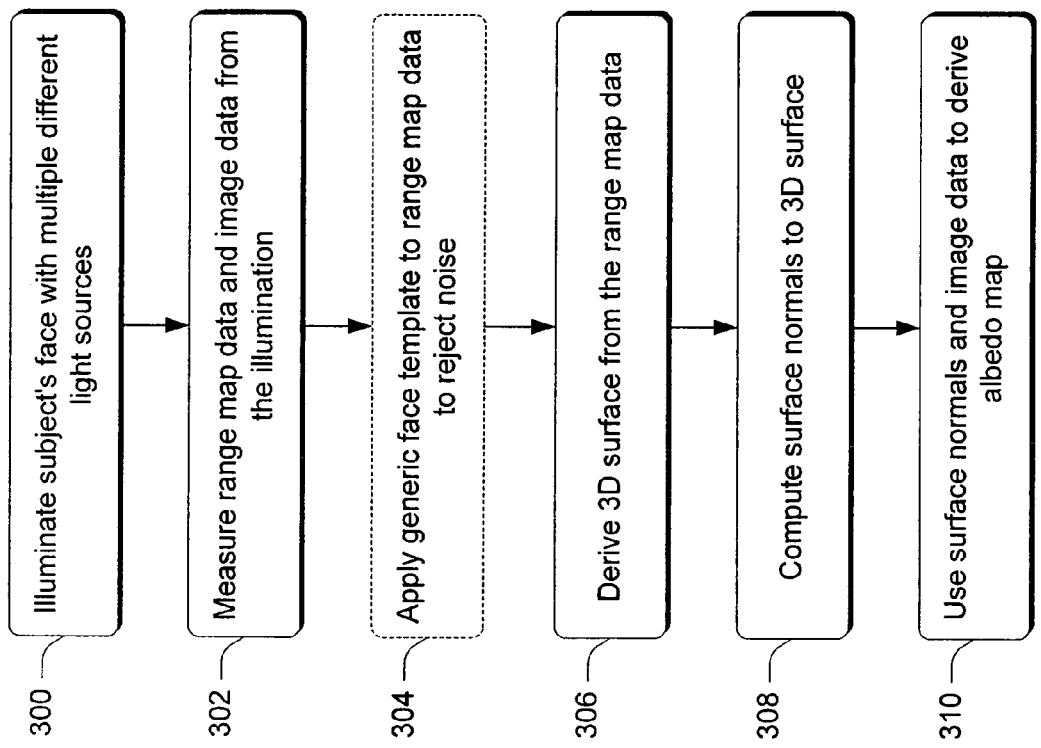
FIG. 3 is a flow diagram that describes an exemplary method for capturing structural information and reflectance information in accordance with the described embodiment.

FIG. 3 is a flow diagram that describes steps in a method in accordance with this described embodiment. The described method enables information or data that pertains to structure and reflection properties of a face to be collected and processed at the same time. Step 300 illuminates a subject's face with multiple different light sources. An exemplary system for implementing this step is shown in FIG. 2. It will be appreciated that although two exemplary light sources are utilized in the given example, other numbers of light sources can conceivably be used. Step 302 measures range map data (depth map data) and image data from the illumination of step 300. That is, the illumination of step 300 enables the camera to detect light reflectance that is utilized to provide both range map data and image data (i.e. reflectance) that does not contain the structure light source pattern in it. The range map data and image data are provided to computer 208 (FIG. 2) for processing. At this point, step 304 can optionally apply a generic face template to the range map data to reject various noise that can be associated with the range map data. A generic face template can be considered as a 3D filter that rejects noise in the range map data. Generic face templates will be understood by those skilled in the art.

Step 306 uses the range map data to derive or compute a 3D surface. Any suitable algorithm can be used and will be apparent to those skilled in the art. Exemplary algorithms are described in the following papers: Turk & Levoy, *Zippered Polygon Meshes from Range Images*, SIGGRAPH 94; F. Bernardini, J. Mittleman, H. Rushmeier, C. Silva, and G. Taubin, *The Ball-Pivoting Algorithm for Surface Reconstruction*, Trans. Vis. Comp. Graph. 5:4 (1999). Step 308 then computes surface normal vectors ("surface normals") to the 3D surface of step 306 using known algorithms. One way to accomplish this task is to compute the normals to the triangles, average those triangle normals around each vertex to make vertex normals, and then interpolate the vertex normals across the interior of each triangle. Other methods can, of course, be utilized. Step 310 then uses the computed surface normals of step 308 and the image data of step 302 to derive an albedo map. An albedo is a special type of texture map in which each sample describes the diffuse reflectance of the surface of a face at a particular point on the facial surface. The derivation of an albedo map, given the information provided above, will be understood by those skilled in the art. An exemplary algorithm is described in Marschner, *Inverse Rendering for Computer Graphics*, PhD thesis, Cornell University, August 1998.

At this point, and as shown in FIG. 2, the illumination processing has produced 3D data that describes the structural features of a subject's face and albedo map data that describes the diffuse reflectance of the facial surface.

The above illumination processing can be used to extract the described information, which can then be used for any suitable purpose. In one particularly advantageous embodiment, the extracted information is utilized to extract and recognize a subject's expressions. This information can then be used for expression transformation. In the inventive embodiment described just below, the expressions of one person can be used to transform the expressions of another person in a realistic manner.

Expression Transformation Using a Code Book

Figure 4:
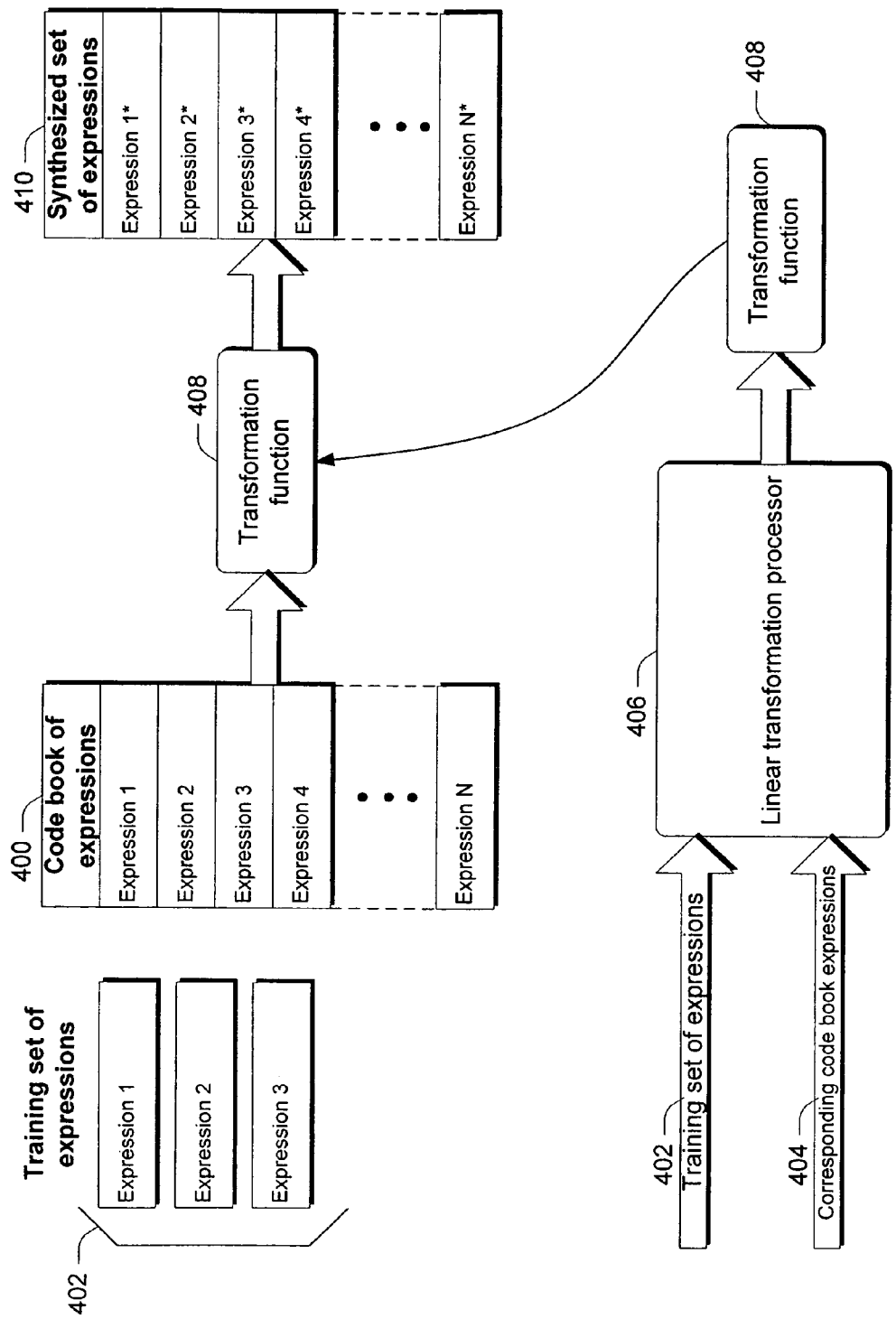
FIG. 4 is a schematic diagram that illustrates an exemplary code book and transformation function in accordance with the described embodiment.

In one expression transformation embodiment, the notion of a code book is introduced and is utilized in the expression transformation operation that is described below. FIG. 4 shows an exemplary code book 400 that contains many different expressions that have been captured from a person. These expressions can be considered as generic expressions, or expressions from a generic person rather than from a particular individual. In the example, the expressions range from Expression 1 through Expression N. Expression 1 could be, for example, a smile; Expression 2 could be a frown; Expression 3 could be an "angry" expression, and the like. The expressions that are contained in code book 400 are mathematically described in terms of their geometry and can be captured in any suitable way such as the process described directly above.

To effect expression transformation, a transformation function is first derived using some of the expressions in code book 400. To derive the transformation function, the notion of a training set of expressions 402 is introduced. The expression training set 402 consists of a set of expressions that are provided by an individual other than the individual whose expressions are described in the code book 400. The training expressions of training set 402 are a subset of the code book expressions. That is, each expression in the training set corresponds to an expression in the code book 400. For example, the training set 402 might consist of three expressions—Expression 1, Expression 2, and Expression 3, where the expressions are "smile", "frown" and "angry" respectively. The goal of the transformation function is to take the geometric deformations that are associated with expressions of the training set, and apply them to all of the expressions of the code book 400 so that the code book expressions are realistic representations of the expressions. That is, consider that each person's face geometrically deforms differently for any given expression. If one person's geometric facial deformations for a given expression were to be simply applied to another person's face for the purpose of rendering the expression, the face to which the deformations were applied would likely look very distorted. This is a result of not only different facial geometries, but also of differing facial deformations as between the faces. Accordingly, a transformation function is derived that gives the best transformation from one set of expressions to another.

Consider again FIG. 4 where a linear transformation processor 406 is shown. Transformation processor 406 can be implemented in any suitable hardware, software, firmware, or combination thereof. In the illustrated example, the linear transformation processor 406 is implemented in software. The linear transformation processor receives as input the training set of expressions 402 and the corresponding code book expressions 404. The transformation processor processes the inputs to derive a transformation function 408. The transformation function 408 can then be applied to all of the expressions in the code book 400 to provide a synthesized set of expressions 410. The synthesized set of expressions represents expressions of the code book that have been manipulated by the geometric deformations associated with the expressions of the person that provided the training set of expressions.

Facial displacements for identical expressions will not be the same on different people for two reasons. First, the motion capture sample points (one particular example of how one could represent face movements in this particular algorithm) will not precisely correspond because of errors in placement. Second, head shape and size varies from person to person.

The first mismatch can be overcome by resampling the motion capture displacement data for all faces at a fixed set of positions on a generic mesh. This is described below in more detail in the section entitled "Exemplary System and Method for Building a Face Model." There, the fixed set of positions is referred to as the "standard sample positions". The resampling function is the mesh deformation function. The standard sample positions are the vertices of the face mesh that correspond to the vertices of the generic mesh subdivided once.

The second mismatch requires transforming displacement data from one face to another to compensate for changes in size and shape of the face. In the illustrated example, this is done by finding a small training set of corresponding expressions for the two data sets and then finding the best linear transformation from one to another. As an example, consider the following: In an experimental environment, emotion expressions were manually labeled for 49 corresponding expressions including various intensities of several expressions. For speech motion, 10,000 frames were automatically aligned using time warping techniques.

Each expression is represented by a 3m-vector g that contains all of the x, y, and z displacements at the m standard sample positions. Given a set of n expression vectors for the face to be transformed, $g_{a1 \ldots n}$, and a corresponding set of vectors for the target face, $g_{b1 \ldots n}$, a set of linear predictors $a_j$ is computed, one for each coordinate of $g_a$, by solving 3m linear least squares systems:

$$a_j \cdot g_{ai} = g_{bi}[j], i=1 \ldots n$$

In the illustrated example, only a small subset of the points of each $g_{aj}$ are used. Specifically, those points that share edges with the standard sample point under consideration. In the mesh that was used, the average valence is about 6 so that the typical $g_{aj}$ has 18 elements. The resulting system is roughly n by 18.

The resulting linear system may be ill-conditioned, in which case the linear predictors $a_j$ do not generalize well. The spread of the singular values is controlled when computing the pseudoinverse to solve for the $a_j$, which greatly improves generalization. All singular values less than $\alpha\sigma_1$, where $\sigma_1$ is the largest singular value of the matrix and $\alpha=0.2 \ldots 0.1$ are zeroed out.

Figure 5:
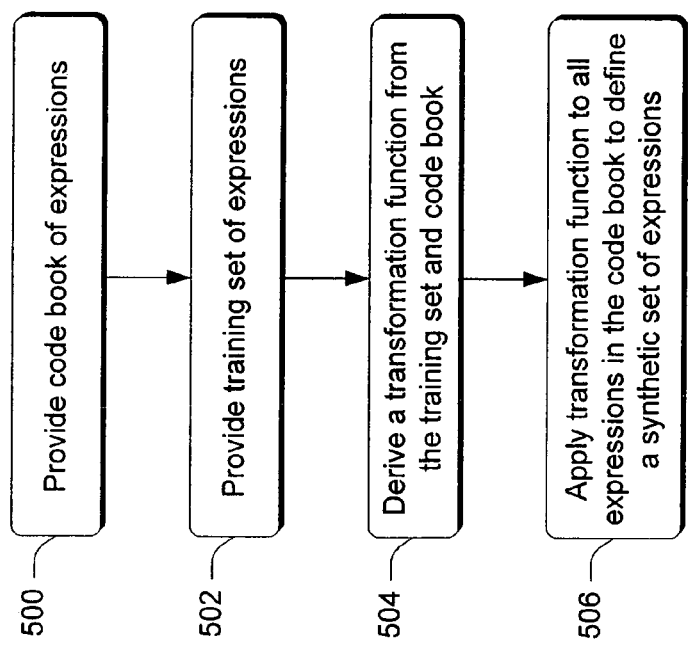
FIG. 5 is a flow diagram that illustrates an expression transformation process in accordance with the described embodiment.

FIG. 5 is a flow diagram that describes steps in an expression transformation method in accordance with this described embodiment. Step 500 provides a code book of expressions. An example of such a code book is given above. Step 502 provides a training set of expressions. Typically, this training set is a set of expressions from a person who is different from the person who provided the code book expressions. The training set of expressions can be captured in any suitable way. As an example, the expressions can be captured using a system such as the one illustrated in FIG. 2. After the training set of expressions is provided, step 504 derives a transformation function using the training set and the code book. One exemplary way of accomplishing this task was described above. Other methods could, of course, be used without departing from the spirit and scope of the claimed subject matter. For example, one could use various kinds of nonlinear transformations such as neural networks, or weighted sums of basis expressions. Once the transformation function is derived, it is applied to all of the expressions in the code book to provide or define a synthetic set of expressions that can then serve as a basis for subsequent facial animation operations.

Exemplary Application

Figure 6:
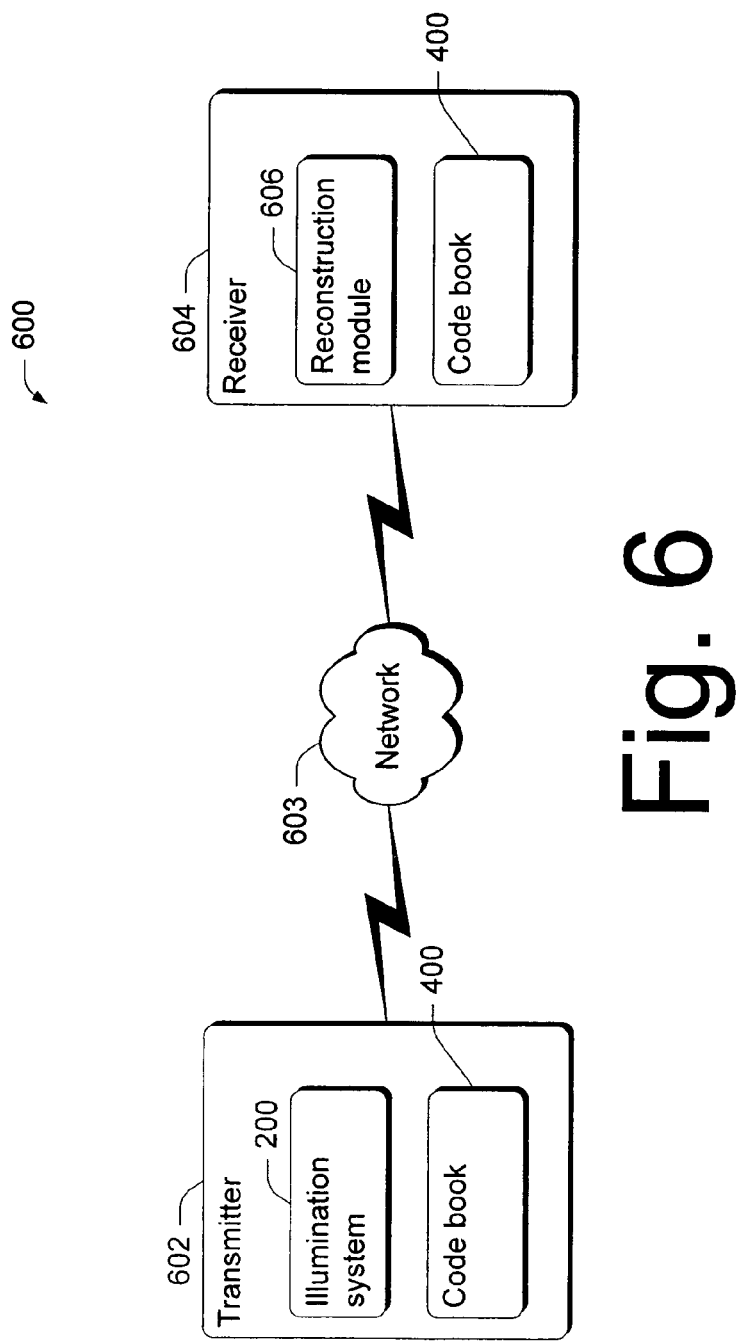
FIG. 6 is a high level diagram of an exemplary system in which certain principles of the described embodiments can be employed.

FIG. 6 shows a system 600 that illustrates but one example of how the expression transformation process described above can be employed. System 600 includes a transmitter computing system or transmitter 602 and a receiver computing system or receiver 604 connected for communication by a network 603 such as the Internet. Transmitter 602 includes an illumination system 200 (FIG. 2) that is configured to capture the expressions of a person as described in connection with FIG. 2. Transmitter 602 also includes a code book 400, such as the one described in connection with FIG. 4. It is assumed that the code book has been synthesized into a synthetic set of expressions as described above. That is, using a training set of expressions provided by the person whose expressions illumination system 200 is configured to capture, the code book has been processed to provide the synthesized set of expressions.

Receiver 604 includes a reconstruction module 606 that is configured to reconstruct facial images from data that is received from transmitter 602. Receiver 604 also includes a code book 400 that is identical to the code book that is included with the transmitter 602. Assume now, that the person located at transmitter 602 attempts to communicate with a person located at receiver 604. As the person located at the transmitter 602 moves their face to communicate, their facial expressions and movement are captured and processed by the transmitter 602. This processing can include capturing their expressions and searching the synthesized code book to find the nearest matching expression in the code book. When a matching expression is found in the synthesized code book, an index of that expression can be transmitted to receiver 604 and an animated face can be reconstructed using the reconstruction module 606.

Exemplary Facial Transformation

FIG. 7 shows some effects of expression transfer in accordance with the described embodiment. The pictures in the first row constitute a synthetic face of a first person (person A) that shows three different expressions. These pictures are the result of the captured facial motion of person A. Face motion for a second person (person B) was captured. The captured face motion for person B is shown in the third row. Here, the 3D motion data was captured by placing a number of colored dots on the person's face and measuring the dots' movements when the person's face was deformed, as will be understood by those of skill in the art. Motion data can, however, be captured by the systems and methods described above. Person B's captured motions were then used, as described above, to transform the expressions of person A. The result of this operation is shown in the second row. The expressions in the three sets of pictures all correspond with one another. Notice how the expressions in the first and second row look very similar even though they were derived from two very different people, while the original expressions of the second person (row 3) look totally unlike those of the first and second rows.

Exemplary System and Methods for Building a Face Model

The model of a face that is needed to produce a realistic image has two parts to it. The first part of the model relates to the geometry of the face (i.e. the shape of the surface of the face) while the second part of the model relates to the reflectance of the face (i.e. the color and reflective properties of the face). This section deals with the first part of that model—the geometry of the face.

The geometry of the face consists of a skin surface plus additional surfaces for the eyes. In the present example, the skin surface is derived from a laser range scan of the head and is represented by a subdivision surface with displacement maps. The eyes are a separate model that is aligned and merged with the skin surface to produce a complete face model suitable for high quality rendering.

Mesh Fitting

The first step in building a face model is to create a subdivision surface that closely approximates the geometry measured by the laser range scanner. In the illustrated example, the subdivision surfaces are defined from a coarse triangle mesh using Loop's subdivision rules. Loop's subdivision rules are described in detail in Charles Loop, *Smooth Subdivision Surfaces Based on Triangles*, PhD thesis, University of Utah, August 1987. In addition, the subdivision surfaces are defined with the addition of sharp edges similar to those described by Hoppe et al., *Piecewise smooth surface reconstruction*, Computer Graphics (SIGGRAPH '94 Proceedings) pps. 295-302, July 1994. Note that the non-regular crease masks are not used. In addition, when subdividing an edge between a dart and a crease vertex, only the new edge adjacent the crease vertex is marked as a sharp edge.

A single base mesh is used to define the subdivision surfaces for all of the face models, with only the vertex positions varying to adapt to the shape of each different face. In the illustrated example, a base mesh having 227 vertices and 416 triangles was defined to have the general shape of a face and to provide greater detail near the eyes and lips, where the most complex geometry and motion occur. The mouth opening is a boundary of the mesh, and is kept closed during the fitting process by tying together the positions of the corresponding vertices on the upper and lower lips. The base mesh has a few edges marked for sharp subdivision rules that serve to create corners at the two sides of the mouth opening and to provide a place for the sides of the nose to fold. Because the modified subdivision rules only introduce creases for chains of at least three sharp edges, this model does not have creases in the surface; only isolated vertices fail to have well-defined limit normals.

Figure 8:
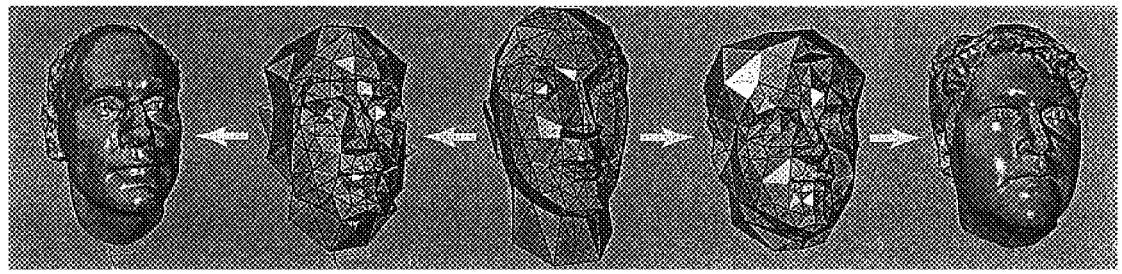
FIG. 8 is a color picture that illustrates the process of mapping the same subdivision control mesh to a displaced subdivision surface for different faces.

FIG. 8 shows an example of a coarse defined mesh (the center figure) that was used in accordance with this example. FIG. 8 visually shows how the coarse mesh can be used to map the same subdivision control (coarse) mesh to a displaced subdivision surface for each face so that the result is a natural correspondence from one face to another. This aspect is discussed in more detail below.

The process used to fit the subdivision surface to each face is based on an algorithm described by Hoppe et al. *Piecewise smooth surface reconstruction*, Computer Graphics (SIGGRAPH '94 Proceedings) pps. 295-302, July 1994. Hoppe's surface fitting method can essentially be described as consisting of three phases: a topological type estimation (phase 1), a mesh optimization (phase 2), and a piecewise smooth surface optimization (phase 3).

Phase 1 constructs a triangular mesh consisting of a relatively large number of triangles given an unorganized set of points on or near some unknown surface. This phase determines the topological type of the surface and produces an initial estimate of geometry. Phase 2 starts with the output of phase 1 and reduces the number of triangles and improves the fit to the data. The approach is to cast the problem as optimization of an energy function that explicitly models the trade-off between the competing goals of concise representation and good fit. The free variables in the optimization procedure are the number of vertices in the mesh, their connectivity, and their positions. Phase 3 starts with the optimized mesh (a piecewise linear surface) that is produced in phase 2 and fits an accurate, concise piecewise smooth subdivision surface, again by optimizing an energy function that trades off conciseness and fit to the data. The phase 3 optimization varies the number of vertices in the control mesh, their connectivity, their positions, and the number and locations of sharp features. The automatic detection and recovery of sharp features in the surface is an essential part of this phase.

In the present embodiment, processing differs from the approach described in Hoppe et al. in a couple of ways. First, continuous optimization is performed only over vertex positions, since we do not want to alter the connectivity of the control mesh. Additionally, feature constraints are added as well as a smoothing term.

In the illustrated example, the fitting process minimizes the functional:

$$E(v) = E_d(v,p) + \lambda E_s(v) + \mu E_c(v)$$

where v is a vector of all the vertex positions, and p is a vector of all the data points from the range scanner. The subscripts on the three terms stand for distance, shape, and constraints. The distance functional $E_d$ measures the sum-squared distance from the range scanner points to the subdivision surface:

$$E_d(v, p) = \sum_{i=1}^{n_p} a_i \| p_i - \Pi(v, p_i) \|^2$$

where $p_i$ is the $i^{th}$ range point and $\Pi(v, p_i)$ is the projection of that point onto the subdivision surface defined by the vertex positions v. The weight $a_i$ is a Boolean term that causes points for which the scanner's view direction at $p_i$ is not consistent with the surface normal at $\Pi(v, p_i)$ to be ignored. Additionally, points are rejected that are farther than a certain distance from the surface:

$$a_i = \begin{cases} 1 & \text{if } \langle s(p_i), n(\Pi(v, p_i)) \rangle > 0 \text{ and } \| p_i - \Pi(v, p_i) \| < d_0 \\ 0 & \text{otherwise} \end{cases}$$

where s(p) is the direction toward the scanner's viewpoint at point p and n(x) is the outward-facing surface normal at point x.

The smoothness functional $E_s$ encourages the control mesh to be locally planar. It measures the distance from each vertex to the average of the neighboring vertices:

$$E_s(v) = \sum_{j=1}^{n_v} \left\| v_j - \frac{1}{deg(v_j)} \sum_{i=1}^{deg(v_j)} v_{k_i} \right\|^2$$

The vertices $v_{ki}$ are the neighbors of $v_j$.

Figure 9:
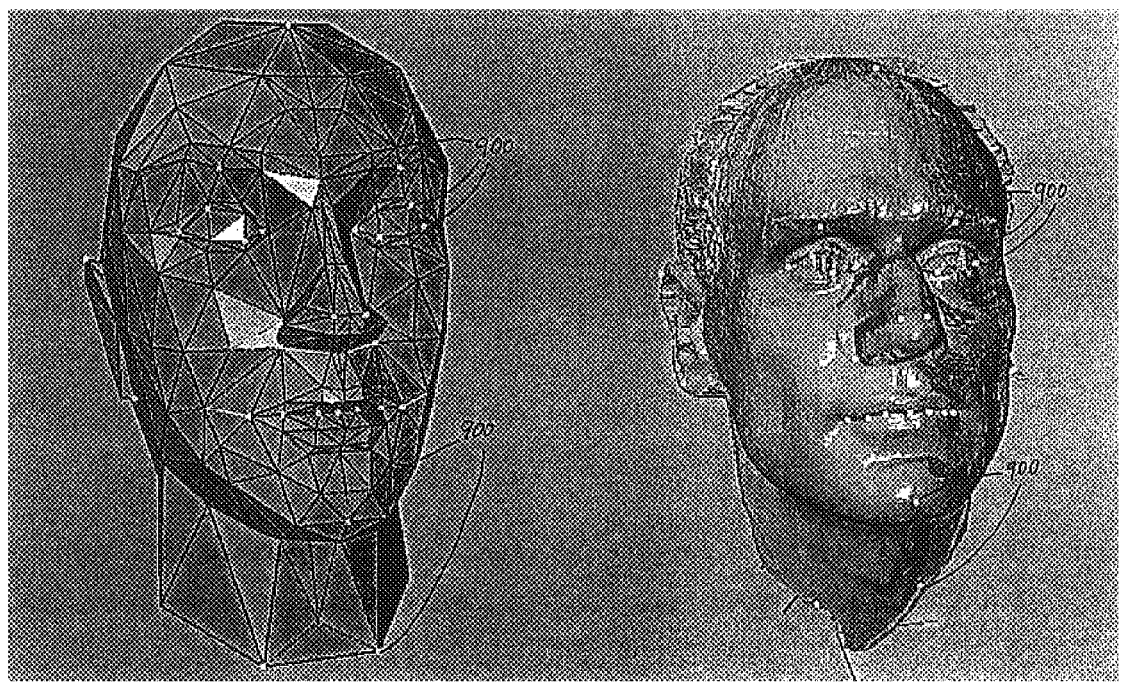
FIG. 9 is a color picture that illustrates exemplary constraints that are utilized to enforce feature correspondence during surface fitting.

The constraint functional $E_c$ is simply the sum-squared distance from a set of constrained vertices to a set of corresponding target positions:

$$E_c(v) = \sum_{j=1}^{n_c} \|A_{c_i} v - d_i\|^2$$

where $A_j$ is the linear function that defines the limit position of the $j^{th}$ vertex in terms of the control mesh, so the limit position of vertex $c_i$ is attached to the 3D point $d_i$. The constraints could instead be enforced rigidly by a linear reparameterization of the optimization variables, but it has been found that the soft-constraint approach helps guide the iteration smoothly to a desirable local minimum. The constraints are chosen by the user to match the facial features of the generic mesh to the corresponding features on the particular face being fit. In the present example, approximately 25 to 30 constraints are used, concentrating on the eyes, nose, and mouth. FIG. 9 shows the constraints on the subdivision control mesh at 900 and their corresponding points on a face model.

Minimizing E(v) is a nonlinear least-squares problem, because Π and $a_i$ are not linear functions of v. However, such can be made a linear problem by holding $a_i$ constant and approximating Π(v, $p_i$) by a fixed linear combination of control vertices. The fitting process therefore proceeds as a sequence of linear least-squares problems with the $a_i$ and the projections of the $p_i$ onto the surface being recomputed before each iteration. The subdivision limit surface is approximated for these computations by the mesh at a particular level of subdivision. Fitting a face takes a small number of iterations (fewer than 30), and the constraints are updated according to a simple schedule as the iteration progresses, beginning with a high λ and low μ to guide the optimization to a very smooth approximation of the face, and progressing to a low λ and high μ so that the final solution fits the data and the constraints closely. The computation time in practice is dominated by computing Π(v, $p_i$).

To produce the mesh for rendering, the surface is subdivided to the desired level, producing a mesh that smoothly approximates the face shape. A displacement is then computed for each vertex by intersecting the line normal to the surface at that vertex with the triangulated surface defined by the original scan as described in Lee et al., *Displaced Subdivision Surfaces*, (SIGGRAPH '00 Proceedings) July 2000. The resulting surface reproduces all the salient features of the original scan in a mesh that has somewhat fewer triangles, since the base mesh has more triangles in the more important regions of the face. The subdivision-based representation also provides a parameterization of the surface and a built-in set of multiresolution basis functions defined in that parameterization and, because of the feature constraints used in the fitting, creates a natural correspondence across all faces that are fit using this method. This structure is useful in many ways in facial animation.

Figure 10:
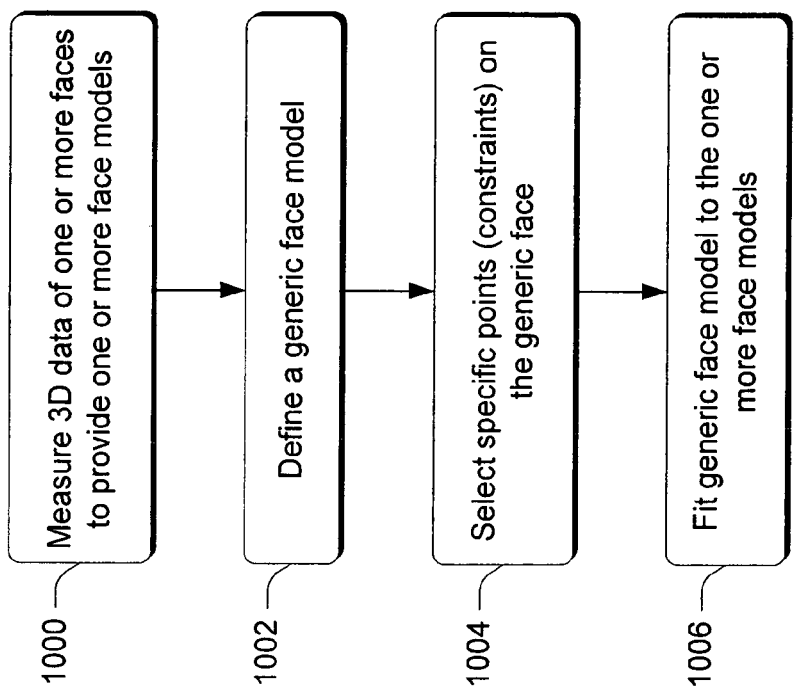
FIG. 10 is a flow diagram that describes steps in a surface fitting method in accordance with the described embodiment.

FIG. 10 is a flow diagram that describes steps in a method for building a face model in accordance with this described embodiment. The method can be implemented in any suitable hardware, software, firmware or combination thereof. In the present example, the method is implemented in software.

Step 1000 measures 3D data for one or more faces to provide corresponding face models. In the above example, the 3D data was generated through the use of a laser range scan of the faces. It will be appreciated that any suitable method of providing the 3D data can be used. Step 1002 defines a generic face model that is to be used to fit to the one or more face models. It will be appreciated that the generic face model can advantageously be utilized to fit to many different faces. Accordingly, this constitutes an improvement over past methods in which this was not done. In the example described above, the generic face model comprises a mesh structure in the form of a coarse triangle mesh. The triangle mesh defines subdivision surfaces that closely approximate the geometry of the face. In the illustrated example, a single base mesh is used to define the subdivision surfaces for all of the face models. Step 1004 selects specific points or constraints on the generic face model. These specific points or constraints are mapped directly to corresponding points that are marked on the face model. The mapping of these specific points takes place in the same manner for each of the many different possible face models. Step 1006 fits the generic face model to the one or more face models. This step is implemented by manipulating only the positions of the vertices to adapt to the shape of each different face. During the fitting process continuous optimization is performed only over the vertex positions so that the connectivity of the mesh is not altered. In addition, the fitting process involves mapping the specific points or constraints directly to the face model. In addition, a smoothing term is added and minimized so that the control mesh is encouraged to be locally planar.

Adding Eyes

The displaced subdivision surface just described represents the shape of the facial skin surface quite well. There are, however, several other features that are desirable for a realistic face. The most important of these is the eyes. Since the laser range scanner does not capture suitable information about the eyes, the mesh is augmented for rendering by adding separately modeled eyes. Unlike the rest of the face model, the eyes and their motions are not measured from a specific person, so they do not necessarily reproduce the appearance of the real eyes. However, their presence and motion is critical to the overall appearance of the face model.

Any suitable eye model can be used to model the eyes. In the illustrated example, a commercial modeling package was used to build a model consisting of two parts. The first part is a model of the eyeball, and the second part is a model of the skin surface around the eye, including the eyelids, orbit, and a portion of the surrounding face (this second part will be called the "orbit surface"). In order for the eye to become part of the overall face model, the orbit surface must be made to fit the individual face being modeled and the two surfaces must be stitched together. This is done in two steps: first the two meshes are warped according to a weighting function defined on the orbit surface, so that the face and orbit are coincident where they overlap. Then the two surfaces are cut with a pair of concentric ellipsoids and stitched together into a single mesh.

Note that one of the advantageous features of the embodiments described above is that they provide a structure or framework that can be used to transform the expressions of one person into expressions of another person. Because the fit of the generic face model to each individual face is constrained so that any given part of the generic model always maps to the same feature on every person's face—for example, the left corner of the mouth in the generic model always maps to the left corner of the mouth on any person's face—the set of fitted face models provides a means for determining the point on any face that corresponds to a particular point on a particular face. For example, suppose the motion of the left corner of the mouth on person A's face has been measured. We can use the fit of the generic model to face A to determine which point of the generic model corresponds to that measured point, and then we can use the fit of the generic model to face B to determine which point on B's face corresponds to the computed point on the generic model and therefore also to the measured point on face A. This information is essential to transforming motion from one face to another because we have to know which parts of the new face need to be moved to reproduce the motions we measured from a set of points on the measured face.

Moving the Face

The motions of the face are specified by the time-varying 3D positions of a set of sample points on the face surface. When the face is controlled by motion-capture data these points are the markers on the face that are tracked by the motion capture system. The motions of these points are used to control the face surface by way of a set of control points that smoothly influence regions of the surface. Capturing facial motion data can be done in any suitable way, as will be apparent to those of skill in the art. In one specific example, facial motion was captured using the technique described in Guenter et al., *Making Faces*, Proceedings of SIGGRAPH 1998, pages 55-67, 1998.

Mesh Deformation

The face is animated by displacing each vertex $w_i$ of the triangle mesh from its rest position according to a linear combination of the displacements of a set of control points $q_j$. These control points correspond one-to-one with the sample points $p_j$ that describe the motion. The influence of each control point on the vertices falls off with distance from the corresponding sample point, and where multiple control points influence a vertex, their weights are normalized to sum to 1.

$$\Delta w_i = \frac{1}{\beta_i} \sum_j \alpha_{ij} \Delta q_j; \ \alpha_{ij} = h(\|w_i - p_j\|/r)$$

where $\beta_i = \Sigma_k \alpha_{ik}$ if vertex i is influenced by multiple control points and 1 otherwise. These weights are computed once, using the rest positions of the sample points and face mesh, so that moving the mesh for each frame is just a sparse matrix multiplication. For the weighting function, the following was used:

$h(x) = \frac{1}{2} + \frac{1}{2} \cos(\pi x)$.

Two types of exceptions to these weighting rules are made to handle the particulars of animating a face. Vertices and control points near the eyes and mouth are tagged as "above" and "below," and control points that are, for example, above the mouth do not influence the motions of vertices below the mouth. Also, a scalar texture map in the region around the eyes is used to weight the motions so that they taper smoothly to zero at the eyelids. To move the face mesh according to a set of sample points, control point positions must be computed that will deform the surface appropriately. Using the same weighting functions described above, we compute how the sample points move in response to the control points. The result is a linear transformation: $p = Aq$. Therefore if at time t we want to achieve the sample positions $p_t$, we can use the control positions $q_t = A^{-1} p_t$. However, the matrix A can be ill-conditioned, so to avoid the undesirable surface shapes that are caused by very large control point motions we compute $A^{-1}$ using the SVD (Singular Value Decomposition) and clamp the singular values of $A^{-1}$ at a limit M. In the illustrated example, M=1.5 was used. A standard reference that discusses SVD is Golub and Van Loan, *Matrix Computations*, $3^{rd}$ edition, Johns Hopkins press, 1996.

Eye and Head Movement

In order to give the face a more lifelike appearance, procedurally generated motion is added to the eyes and separately captured rigid-body motion to the head as a whole. The eyeballs are rotated according to a random sequence of fixation directions, moving smoothly from one to the next. The eyelids are animated by rotating the vertices that define them about an axis through the center of the eyeball, using weights defined on the eyelid mesh to ensure smooth deformations.

The rigid-body motion of the head is captured from the physical motion of a person's head by filming that motion while the person is wearing a hat marked with special machine-recognizable targets (the hat is patterned closely on the one used by Marschner et al., *Image-based BRDF measurement including human skin*, Rendering Techniques '99 (Proceedings of the Eurographics Workshop on Rendering), pps. 131-144, June 1998. By tracking these targets in the video sequence, the rigid motion of the head is computed, which is then applied to the head model for rendering. This setup, which requires simply a video camera, provides a convenient way to author head motion by demonstrating the desired actions.

Exemplary System and Methods for Modeling Reflectance

Rendering a realistic image of a face requires not just accurate geometry, but also accurate computation of light reflection from the skin. In the illustrated example, a physically-based Monte Carlo ray tracer was used to render the face. Exemplary techniques are described in Cook et al., *Distribution Ray Tracing*, Computer Graphics (SIGGRAPH '84 Proceedings), pps. 165-174, July 1984 and Shirley et al., *Monte Carlo techniques for direct lighting calculations*, Transactions on Graphics, 15(1):1-36, 1996. Doing so allows for the use of arbitrary BRDFs (bi-directional reflectance distribution functions) to correctly simulate the appearance of the skin, which is not well approximated by simple shading models. In addition, extended light sources are used, which, in rendering as in portrait photography, are needed to achieve a pleasing image. Two important deviations from physical light transport are made for the sake of computational efficiency: diffuse interreflection is disregarded, and the eyes are illuminated through the cornea without refraction.

In the illustrated example, a reflectance model for the skin is based on measurements of actual human faces. Exemplary techniques are described in Marschner et al., *Image based BRDF measurement including human skin*, Rendering Techniques '99 (Proceedings of the Eurographics Workshop on Rendering), pps. 131-144, June 1999. The measurements describe the average BRDFs of several subjects' foreheads and include fitted parameters for the BRDF model described in Lafortune et al., *Non-linear approximation of reflectance functions*, Computer Graphics (SIGGRAPH '97 Proceedings), pps. 117-126, August 1997. Accordingly, the measurements provide an excellent starting point for rendering a realistic face. However, the measurements need to be augmented to include some of the spatial variation observed in actual faces. This is achieved by starting with the fit to the measured BRDF of one subject whose skin is similar to the skin of the face we rendered and dividing it into diffuse and specular components. A texture map is then introduced to modulate each.

The texture map for the diffuse component, or the "albedo map", modulates the diffuse reflectance according to measurements taken from the subjects' actual faces as described below. The specular component is modulated by a scalar texture map to remove specularity from areas (such as eyebrows and hair) that should not be rendered with skin reflectance and to reduce specularity on the lower part of the face to approximate the characteristics of facial skin. The result is a spatially varying BRDF that is described at each point by a sum of the generalized cosine lobes of Lafortune et al., *Nonlinear approximation of reflectance functions*, Computer Graphics (SIGGRAPH '97 Proceedings), pps. 117-126, August 1997.

Constructing the Albedo Map

In the illustrated and described embodiment, the albedo map, which must describe the spatially varying reflectance due to diffuse reflection, was measured using a sequence of digital photographs of the face taken under controlled illumination.

Figure 11:
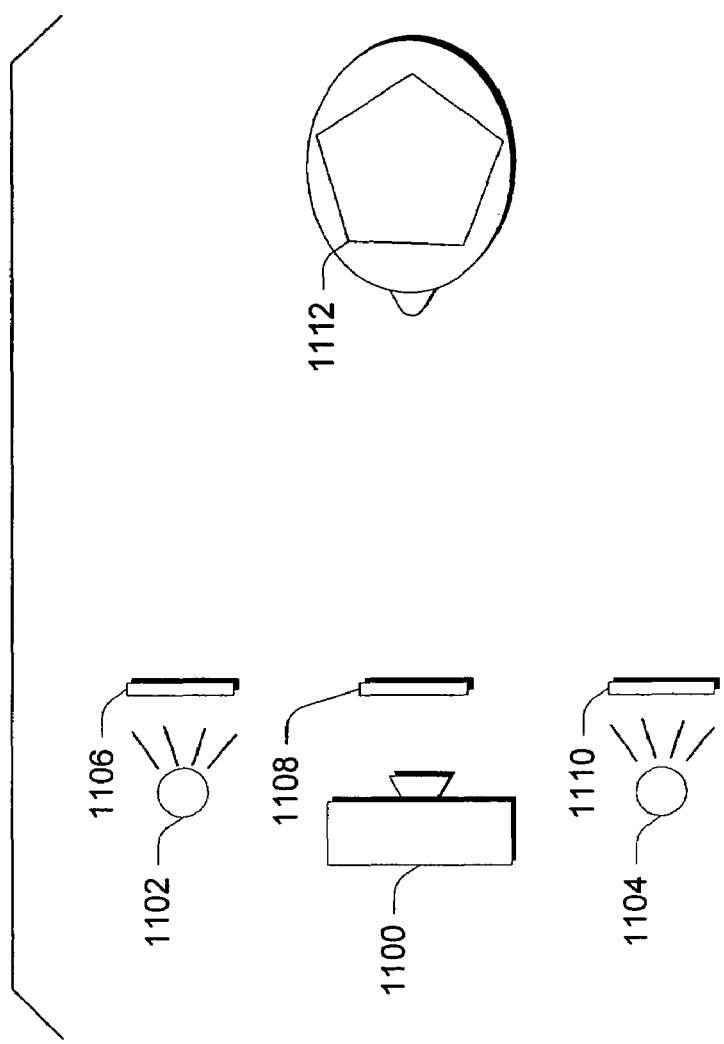
FIG. 11 is a schematic diagram of an exemplary system that can be employed to build an albedo map for a face in accordance with the described embodiment.

FIG. 11 shows an exemplary system that was utilized to capture the digital photographs or images. In the illustrated system, a digital camera 1100 is provided and includes multiple light sources, exemplary ones of which are shown at 1102, 1104. Polarizing filters in the form of perpendicular polarizers 1106, 1108, and 1110 are provided and cover the light sources and the camera lens so that the specular reflections are suppressed, thereby leaving only the diffuse component in the images. In the example, a subject wears a hat 1112 printed with machine-recognizable targets to track head pose. Camera 1100 stays stationary while the subject rotates. The only illumination comes from the light sources 1102, 1104 at measured locations near the camera. A black backdrop is used to reduce indirect reflections from spilled light.

Figure 12:
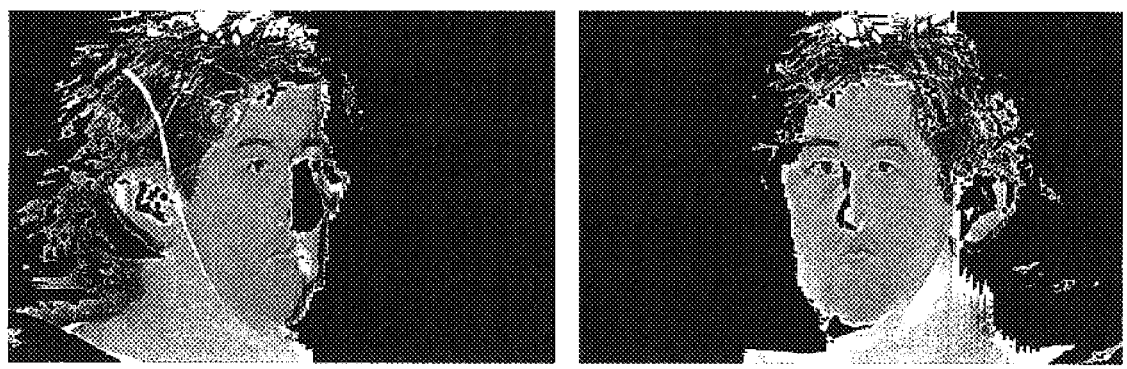
FIG. 12 is a color picture of an exemplary albedo map for two photographs that are projected into texture space and corrected for lighting.

Since the camera and light source locations are known, standard ray tracing techniques can be used to compute the surface normal, the irradiance, the viewing direction, and the corresponding coordinates in texture space for each pixel in each image. Under the assumption that ideal Lambertian reflection is being observed, the Lambertian reflectance can be computed for a particular point in texture space from this information. This computation is repeated for every pixel in one photograph which essentially amounts to projecting the image into texture space and dividing by the computed irradiance due to the light sources to obtain a map of the diffuse reflectance across the surface. Consider FIG. 12 in which two photographs are shown projected into texture space and corrected for lighting. In practice the projection is carried out by reverse mapping, with the outer loop iterating through all the pixels in the texture map, and stochastic supersampling is used to average over the area in the image that projects to a particular texture pixel.

The albedo map from a single photograph only covers part of the surface, and the results are best at less grazing angles. Accordingly a weighted average of all the individual maps is computed to create a single albedo map for the entire face. The weighting function, a visual example of which is given in FIG. 13, should be selected so that higher weights are given to pixels that are viewed and/or illuminated from directions nearly normal to the surface, and should drop to zero well before either viewing or illumination becomes extremely grazing. In the illustrated example, the following function was used $(\cos \theta_i \cos \theta_e - c)^p$, with $c=0.2$ and $p=4$.

Before computing the albedo for a particular texture pixel, we verify that the pixel is visible and suitably illuminated. Multiple rays are traced from points on the pixel to points on the light source and to the camera point, and the pixel is marked as having zero, partial, or full visibility and illumination. It is prudent to err on the large side when estimating the size of the light source. Only albedos for pixels that are fully visible, fully illuminated by at least one light source, and not partially illuminated by any light source are computed. This ensures that partially occluded pixels and pixels that are in full-shadow or penumbra regions are not used.

Some calibration is required to make these measurements meaningful. The camera's transfer curve was calibrated using the method described in Debevec et al., *Recovering high dynamic range radiance maps from photographs*, Computer Graphics (SIGGRAPH '97 Proceedings), pps. 369-378, August 1997. The light/camera system's flat-field response was calibrated using a photograph of a large white card. The lens's focal length and distortion were calibrated using the technique described in Zhang, *A flexible new technique for camera calibration*, Technical Report MSR-TR-98-71, Microsoft Research, 1998. The absolute scale factor was set using a reference sample of known reflectance. When image-to-image variation in light source intensity was a consideration, control was provided by including the reference sample in every image.

The texture maps that result from this process do a good job of automatically capturing the detailed variation in color across the face. In a few areas, however, the system cannot compute a reasonable result. Additionally, the strap used to hold the calibration hat in place is visible. These problems are removed by using an image editing tool and filling in blank areas with nearby texture or with uniform color.

Figure 14:
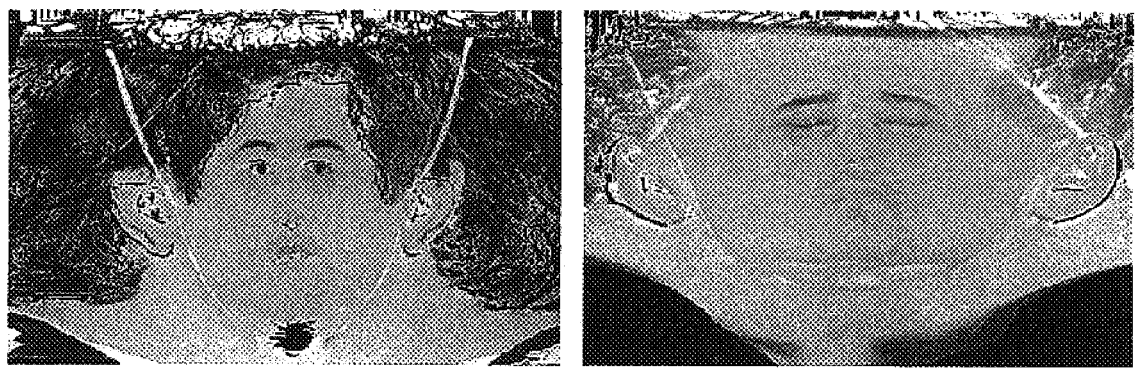
FIG. 14 is a color picture of two full albedo maps for two different data sets.
Figure 15:
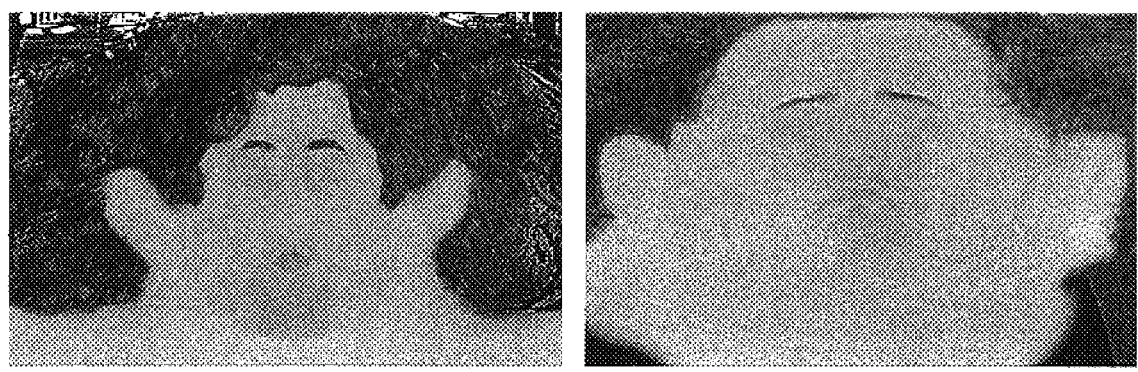
FIG. 15 is a color diagram of the FIG. 14 albedo maps after editing.

FIGS. 14 and 15 show the raw and edited albedo maps for comparison. The areas where the albedo map does not provide reasonable results can be seen where the surface is not observed well enough (e. g., under the chin) or is too intricately shaped to be correctly scanned and registered with the images (e.g the ears). Neither of these types of areas requires the texture from the albedo map for realistic appearance—the first because they are not prominently visible and the second because the geometry provides visual detail—so this editing has relatively little effect on the appearance of the final renderings.

Figure 16A:
FIGS. 16a-c is a collection of color pictures of a face model that is rendered in different orientations and under different lighting conditions.
Figure 16B:
Figure 16C:

FIGS. 16a-c shows several different aspects of the face model, using still frames from the accompanying video. In the first row (FIG. 16a), the face is shown from several angles to demonstrate that the albedo map and measured BRDF realistically capture the distinctive appearance of the skin and its color variation over the entire face, viewed from any angle. The second row (FIG. 16b) shows the effects of rim and side lighting, including strong specular reflections at grazing angles. Note that the light source has the same intensity and is at the same distance from the face for all three images in this row. The directional variation in the reflectance leads to the familiar lighting effects seen in the renderings. In the third row (FIG. 16c), expression deformations are applied to the face to demonstrate that the face still looks natural under normal expression movement.

FIG. 17 is a flow diagram that describes steps in a method for creating an albedo map in accordance with the described embodiment. The method can be implemented in any suitable hardware, software, firmware or combination thereof. In the described embodiment, the method is implemented in software in connection with a system such as the one shown and described in FIG. 11.

Step 1700 provides one or more polarized light sources that can be used to illuminate a subject. Exemplary light sources are described above. In the described embodiment, the light sources are selected so that the specular component of the subject's facial reflectance is suppressed or eliminated. Step 1702 illuminates the subject's face with the light sources. Step 1704 rotates the subject while a series of digital photographs or images are taken. Step 1706 computes surface normals, irradiance, viewing direction and coordinates in texture space for each pixel in the texture map. The computations can be done using known algorithms. Step 1708 computes the Lambertian reflectance for a particular pixel in the texture space for the image. This provides an albedo for the pixel. Step 1710 determines whether there are any additional pixels in the albedo map. If there are, step 1712 gets the next pixel and returns to step 1708. If there are no additional pixels in the albedo map, step 1714 ascertains whether there are any additional digital images. If there are additional digital images, step 1716 gets the next digital image and returns to step 1706. If there are no additional digital images, then step 1718 computes a weighted average of the individual albedo maps for each image to create a single albedo map for the entire face. One specific example of how this weighted average processing takes place is given above and described in Marschner, *Inverse Rendering for Computer Graphics*, PhD thesis, Cornell University, August 1998.

Figure 18:
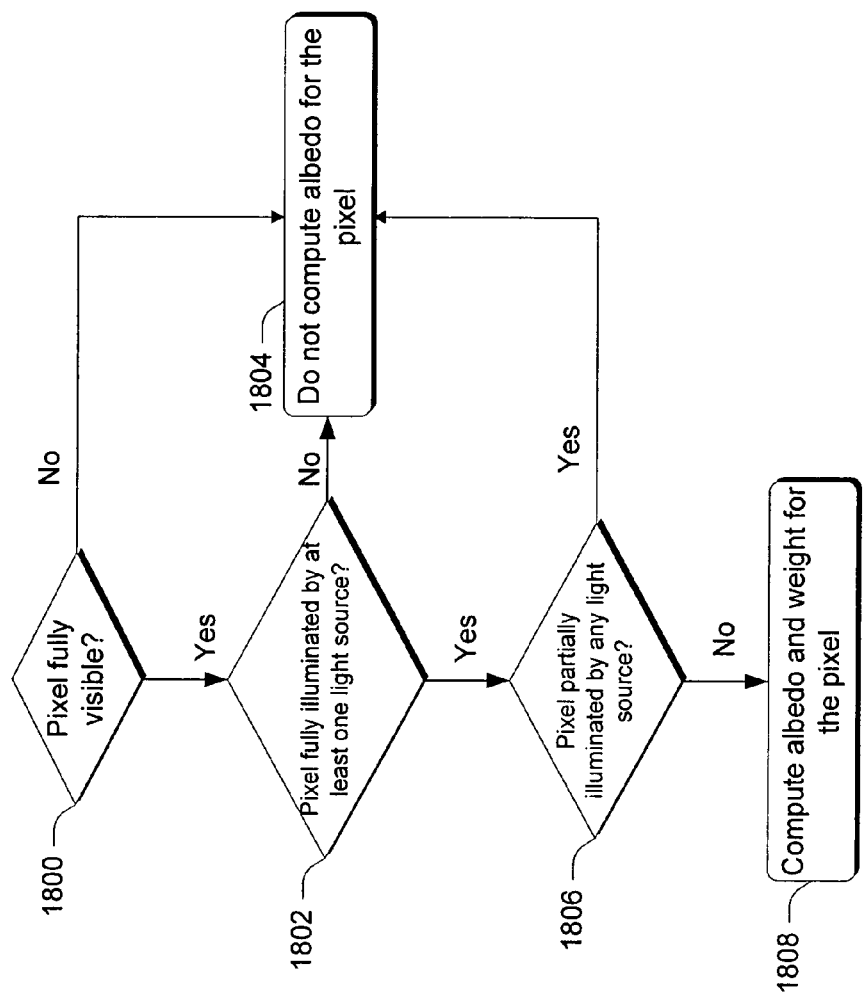
FIG. 18 is a flow diagram that describes steps in a method for computing an albedo for a single pixel in accordance with the described embodiment.

FIG. 18 is a flow diagram that describes steps in a method for computing an is albedo for a single pixel. This method can be implemented in any suitable hardware, software, firmware or combination thereof. In the described embodiment, the method is implemented in software. Step 1800 determines, for a given pixel, whether the pixel is fully visible. If the pixel is not fully visible, then an albedo for the pixel is not computed (step 1804). If the pixel is fully visible, step 1802 determines whether the pixel is fully illuminated by at least one light source. If the pixel is not fully illuminated by at least one light source, then an albedo for the pixel is not computed (step 1804). If the pixel is fully illuminated by at least one light source, then step 1806 determines whether the pixel is partially illuminated by any light source. If so, then an albedo is not computed for the pixel. If the pixel is not partially illuminated by any light source, then step 1808 computes an albedo and a weight for the pixel. The weights are later used in averaging together individual maps. Hence, as discussed above, albedos are computed only for pixels that are fully visible, fully illuminated by at least one light source, and not partially illuminated by any light source. This ensures that partially occluded pixels and pixels that are in full-shadow or penumbra are not used.

Conclusion

The embodiments described above provide systems and methods that address the challenge of modeling and rendering faces to the high standard of realism that must be met before an image as familiar as a human face can appear believable. The philosophy of the approach is to use measurements whenever possible so that the face model actually resembles a real face. The geometry of the face is represented by a displacement-mapped subdivision surface that has consistent connectivity and correspondence across different faces. The reflectance comes from previous BRDF measurements of human skin together with new measurements that combine several views into a single illumination-corrected texture map for diffuse reflectance. The motion comes from previously described motion capture technique and is applied to the face model using an improved deformation method that produces motions suitable for shaded surfaces. The realism of the renderings is greatly enhanced by using the geometry, motion, and reflectance of real faces in a physically-based renderer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented facial image-processing method comprising:
   illuminating a face with multiple different light sources simultaneously, wherein at least one of the light sources is polarized;
   measuring range map data from said illuminating;
   measuring image data from said illuminating;
   applying a generic face template to the range map data to reject noise that is associated with the range map data;
   deriving a 3-dimensional surface from the range map data;
   computing surface normals to the 3-dimensional surface; and
   processing the surface normals and the image data to derive an albedo map.

2. The method of claim 1, wherein all of the light sources are polarized.

3. The method of claim 1 further comprising prior to deriving the 3-dimensional surface, filtering the range map data.

4. A computer-implemented facial image-processing method comprising:
   illuminating a face with illumination, wherein the illumination comprises:
   a first light source that is polarized and selected so that specularly-suppressed reflective properties of the face can be ascertained; and
   a second light source that projects a structured pattern onto the face, while simultaneously illuminating the face with the first light source, wherein the second light source projects the structured pattern on the face from which structure data can be ascertained; and
   contemporaneously capturing structure data describing the face's dimensional shape and structure and reflectance data describing reflectance properties of the face from the illumination, whereby the computer processes the structure data and the reflectance data to provide range map data, the range map data being filtered by applying a generic face template to reject noise in the range map data.

5. The method of claim 4, wherein said illuminating comprises using additional light sources.

6. The method of claim 4, wherein the illuminating further comprises an infrared light source.

7. The method of claim 4, wherein the first and second light sources comprise infrared light sources.

8. The method of claim 4, wherein said illuminating comprises using multiple polarized light sources.

9. The method of claim 4, wherein said illuminating comprises illuminating the face with light sources at different frequencies.

10. The method of claim 4, wherein said capturing comprises using a camera having a polarizer that suppresses specularly-reflected light so that diffuse component reflection data is captured.

11. The method of claim 10, wherein the second light source comprises an infrared light source.

12. The method of claim 4, wherein said illuminating comprises illuminating the face with multiple narrow-band light sources.

13. A computer-implemented facial image-processing method comprising:
- illuminating a face with a first polarized light source that is selected so that specularly-suppressed reflective properties of the face can be ascertained;
- illuminating the face with a second structured light source that projects a pattern onto the face, while simultaneously illuminating the face with the first polarized light source;
- capturing both specularly-suppressed reflection data and structure data from the simultaneous illumination, whereby the computer processes the structure data and the specularly-suppressed reflection data to provide range map data, the range map data being filtered by applying a generic face template to reject noise in the range map data.

14. The method of claim 13, wherein the light sources provide light at different frequencies.

15. The method of claim 13, wherein the light sources provide infrared light.

16. The method of claim 13 further comprising processing the captured data to provide both (a) data that describes dimensional aspects of the face and (b) data that describes diffuse reflective properties of the face.

17. The method of claim 16, wherein the data that describes the diffuse reflective properties of the face comprises an albedo map.

* * * * *